US012694250B2

(12) United States Patent　　(10) Patent No.:　US 12,694,250 B2

Nakajima　　(45) Date of Patent:　　Jul. 28, 2026

(54) PRINTER CONVERTING CHARACTER CODE INCLUDED IN PRINT DATA INTO CHARACTER CODE OF PRESCRIBED CHARACTER ENCODING SYSTEM TO GENERATE RASTER DATA

(71) Applicant: BROTHER KOGYO KABUSHIKI KAISHA, Nagoya (JP)

(72) Inventor: Kenshiro Nakajima, Kani (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 275 days.

(21) Appl. No.: 18/635,487

(22) Filed: Apr. 15, 2024

(65) Prior Publication Data

US 2024/0354534 A1　Oct. 24, 2024

(30) Foreign Application Priority Data

Apr. 20, 2023　(JP) ................................. 2023-069341

(51) Int. Cl.
　*G06K 15/02*　　　(2006.01)
　*G06F 3/12*　　　(2006.01)
(52) U.S. Cl.
　CPC ..... *G06K 15/1836* (2013.01); *G06K 15/1827* (2013.01); *G06F 3/1297* (2013.01)
(58) Field of Classification Search
None
See application file for complete search history.

(56)　　　　References Cited

U.S. PATENT DOCUMENTS 8,363,231 B2 *　1/2013　Soord ................... G06F 3/1253
　　　　　　　　　　　　　　　　　　　 358/1.11
2005/0254081 A1 *　11/2005　Ryu ................... H04N 1/32117
　　　　　　　　　　　　　　　　　　　 358/1.15
2009/0097049 A1 *　4/2009　Cho ................... H04N 1/00973
　　　　　　　　　　　　　　　　　　　 358/1.11
2011/0063671 A1　3/2011　Akahane
　　　　　　　　　　(Continued)

FOREIGN PATENT DOCUMENTS

JP　　　　2014-056583 A　　　3/2014

*Primary Examiner* — Haris Sabah
(74) *Attorney, Agent, or Firm* — Scully, Scott, Murphy & Presser, P.C.

(57)　　　　　　ABSTRACT

A controller included in a printer performs a specific process when print data includes a print-data character code. The specific process is to: specify a print-data character encoding system describing the print-data character code; and determine whether the print-data character encoding system is a prescribed character encoding system. When the specific process determines that the print-data character encoding system is not the prescribed character encoding system, the controller reads a print-data conversion table stored in the memory. The print-data conversion table maps each of a plurality of reference character codes of the print-data character encoding system to a respective one of a plurality of target character codes of the prescribed character encoding system. The controller converts the print-data character code into a converted print-data character code using the print-data conversion table, and generate raster data using the converted print-data character code for printing with a print engine.

9 Claims, 7 Drawing Sheets

(56) References Cited

U.S. PATENT DOCUMENTS

2013/0107299 A1* 5/2013 Huh ........................ G06K 15/02
                                                            358/1.11
2015/0206038 A1* 7/2015 Yamashita ............ G06F 3/1229
                                                            358/1.11

* cited by examiner

| SYMBOL SET | 8U |
|---|---|
| CHARACTER CODE | UNICODE |
| ⋮ | ⋮ |
| 68 | U+0068 |
| ⋮ | ⋮ |

| SYMBOL SET | OH |
|---|---|
| CHARACTER CODE | UNICODE |
| ⋮ | ⋮ |
| 68 | U+03B7 |
| ⋮ | ⋮ |

PRINTER CONVERTING CHARACTER CODE INCLUDED IN PRINT DATA INTO CHARACTER CODE OF PRESCRIBED CHARACTER ENCODING SYSTEM TO GENERATE RASTER DATA

REFERENCE TO RELATED APPLICATIONS

This application claims priority from Japanese Patent Application No. 2023-069341 filed on Apr. 20, 2023. The entire content of the priority application is incorporated herein by reference.

BACKGROUND ART

Some conventional printers perform printing on the basis of print data described in a page description language using font information of built-in fonts stored on the printer in advance.

SUMMARY

The print data may specify a character encoding system that differs from the character encoding system included in the font information. In such cases, characters specified by the character codes in the two systems may not match, and the printer may not be able to print appropriate characters in the specified font. For this reason, the conventional technology has room for improvement.

In view of the foregoing, it is an object of the present disclosure to provide a printer. The printer includes a memory, a print engine, and a controller. The controller is configured to perform: acquiring print data; a print-data process based on the print data, the print-data process including: a specific process when the print data includes a print-data character code, the specific process being to: specify a print-data character encoding system describing the print-data character code; and determine whether the print-data character encoding system is a prescribed character encoding system, the print-data character encoding system associating each of a plurality of characters with a respective one of a plurality of print-data character codes; a reading process when the specific process determines that the print-data character encoding system is not the prescribed character encoding system, the reading process being to read a print-data conversion table stored in the memory, the print-data conversion table being a conversion table for the print-data character encoding system, the print-data conversion table mapping each of a plurality of reference character codes of the print-data character encoding system to a respective one of a plurality of target character codes of the prescribed character encoding system; a conversion process when the reading process is performed, the conversion process being to convert the print-data character code into a converted print-data character code using the print-data conversion table, the converted print-data character code being a specified target character code among the plurality of target character codes in the print-data conversion table, the specified target character code being mapped from a reference character code matching the print-data character code among the plurality of reference character codes in the print-data conversion table; and a printing process when the conversion process is performed, the printing process being to generate raster data using the converted print-data character code and instruct the print engine to perform printing based on the raster data.

The above structure can increase a probability to print characters in the specified font, even when the print data specifies a character encoding system different from that of the font information.

BRIEF DESCRIPTION OF DRAWINGS

FIGS. 5A and 5B are explanatory diagrams illustrating conversion tables.

DESCRIPTION

Below, a printer according to an embodiment will be described in detail while referring to the accompanying drawings. This embodiment discloses a printer capable of printing based on print data described in a page description language (PDL).

Figure 1:
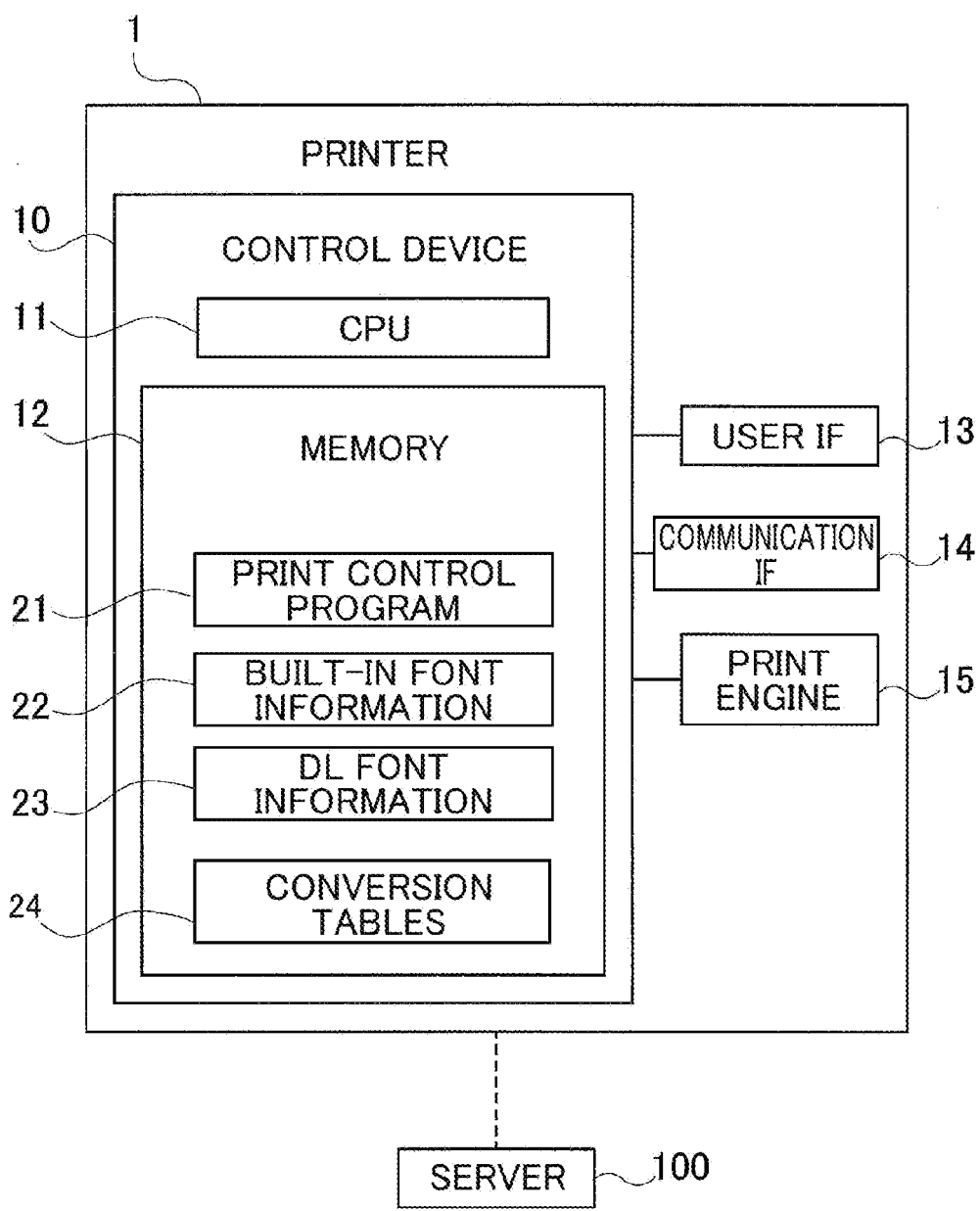
FIG. 1 is a block diagram illustrating an overview configuration of a printer.

FIG. 1 shows a printer 1 according to the present embodiment. The printer 1 is provided with a control device 10 that includes a CPU 11 and a memory 12. The printer 1 is also provided with a user interface (also abbreviated as "user IF") 13, a communication interface (also abbreviated as "communication IF") 14, and a print engine 15. The user interface 13, the communication interface 14, and the print engine 15 are all electrically connected to the control device 10. Note that the control device 10 in FIG. 1 is a collective term that covers all hardware and software used for controlling the printer 1 and is not actually limited to representing a single piece of hardware present in the printer 1. The CPU 11 is an example of a controller. The control device 10 is another example of the controller.

The CPU 11 executes various processes, according to programs read from the memory 12 or on the basis of user operations. The memory 12 stores various programs and various data. The memory 12 is used as a work area for executing various processes. The memory 12 may include a buffer provided by the CPU 11.

An example of the memory 12 is the ROM, RAM, and HDD provided in the printer 1, and any storage medium from which the CPU 11 can read data and to which the CPU 11 can write data. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server 100 or the like on the Internet are not considered an example of the memory 12.

The user interface 13 includes hardware that displays screens for reporting information to the user, and hardware that receives operations performed by the user. The user interface 13 may include a touchscreen or a combination of a display and operation buttons.

The communication interface 14 includes hardware for communicating with an external device. The communication standard employed by the communication interface 14 may be Ethernet, Wi-Fi (U.S. trademark of Wi-Fi Alliance COR-PORATION), Universal Serial Bus (USB), or the like. Alternatively, the printer 1 may be provided with a plurality of communication interfaces 14 supporting a plurality of communication standards. The communication interface 14 may be a network interface.

The print engine 15 includes a device capable of printing based on image data according to the electrophotographic or inkjet method, for example. The print engine 15 may be provided with colorants of a plurality of colors to be able to execute color printing or may be provided with colorant in a single color for monochrome printing.

As shown in FIG. 1, the memory 12 stores a print control program 21, built-in font information 22, downloaded font information (hereinafter "DL font information") 23, and a plurality of conversion tables 24.

Each conversion table 24 maps character codes of different character encoding systems to each other. The conversion tables 24 may or may not be stored on the printer 1 when the printer 1 is shipped from the factory. The conversion tables 24 will be described later in detail.

The built-in font information 22 contains a plurality of sets of glyph data each being for a respective one of a plurality of characters. The built-in font information 22 is font information on built-in fonts and is stored on the printer 1 in advance. The built-in font information 22 is stored in the memory 12 when the printer 1 is shipped from the factory.

The DL font information 23 also contains a plurality of sets of glyph data each being for a respective one of a plurality of characters. The DL font information 23 is font information on downloaded fonts (hereinafter called "DL fonts") and is not stored on the printer 1 in advance. In other words, the DL font information 23 is not stored on the printer 1 when the printer 1 is shipped from the factory.

As shown in FIG. 1, the printer 1 can communicate with a server 100 via the communication interface 14. The server 100 is provided with font information. After the printer was shipped, the printer 1 can download the font information from the server 100 according to a user's instruction and stores the downloaded font information as the DL font information 23. The user may also connect USB memory storing the DL font information 23 to the printer 1, enabling the printer 1 to use the DL font information 23. The DL font information 23 may be provided in various formats including TrueType fonts, OpenType fonts, and PostScript fonts.

Figure 2:
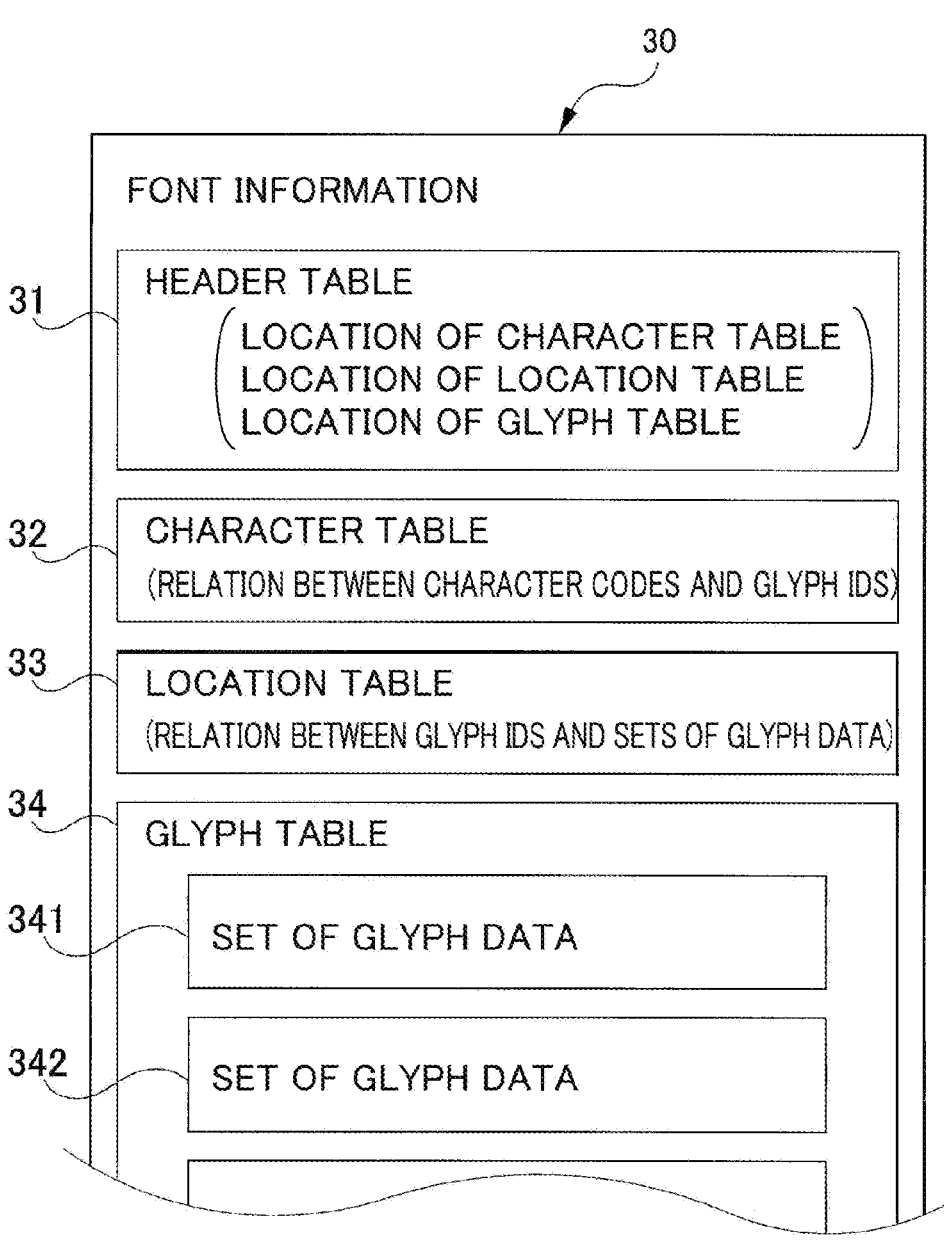
FIG. 2 is an explanatory diagram illustrating a configuration of font information.

Each of the built-in font information 22 and DL font information 23 stored on the printer 1 may include font information in the TrueType font format. Font information in the TrueType font format includes font information 30 for each typeface (font type). In this disclosure, the formats, such as, TrueType fonts, OpenType fonts, and PostScript fonts, indicate formats of files that define corresponding fonts using a plurality of sets of glyph data, and the typefaces of the fonts indicate particular styles of lettering, such as, Times New Roman, Helvetica, Arial, Mincho, and Gothic. The font information 30 is configured as shown in FIG. 2, for example. The font information 30 includes a header table 31, a character table 32, a location table 33, and a glyph table 34. The font information 30 may further include information specifying the printing position and information specifying the character width for each character.

The header table 31 stores information including location information for the character table 32, location information for the location table 33, and location information for the glyph table 34.

The character table 32 maps the character code of each character to a glyph ID for the same character. A character code is information identifying an individual character based on the character encoding system. A character encoding system is a standard for identifying characters and has information specifying character codes identifying characters. There are multiple types of character encoding systems, and the same character may be represented by different character codes in different character encoding systems.

The location table 33 maps each glyph ID to location information for the set of glyph data associated with that glyph ID. A glyph ID is identification information that identifies the set of glyph data for an individual character.

The glyph table 34 stores a plurality of sets of glyph data 341, 342, . . . . Each set of glyph data is information specifying the outline of the corresponding character and is assigned a unique glyph ID.

Font information 30 in the TrueType font format uses character codes of the character encoding system in conformity with the Unicode Standard. Hereinafter, the character encoding system in conformity with the Unicode Standard is referred to as the Unicode character encoding system, or simply the Unicode standard. That is, when the font information 30 is in the True Type font format, the character table 32 of the font information 30 maps glyph IDs to character codes in the Unicode Standard. The Unicode standard is an example of a prescribed character encoding system. The font information 30 in the True Type font format is an example of font information in which each set of glyph data is associated with a character code in the prescribed encoding system.

The printer 1 may also have (stores) font information mapping character codes in the Unicode Standard to sets of glyph data as the built-in font information 22 or/and DL font information 23. However, at least one of the built-in font information 22 and DL font information 23 stored on the printer 1 may contain font information mapping sets of glyph data to character codes in a character encoding system other than the Unicode Standard.

Font information includes information, such as a symbol set, specifying a character encoding system in which character codes therein is represented.

Operations of the printer 1 will be described. Following processes are basically processes performed by the CPU 11 according to programs. The processes performed by the CPU 11 include processes that control hardware through an Application Programming Interface (API) provided in an Operating System (OS) of the printer 1. In the present disclosure, the description of the OS may be omitted when the operations of each program performed using the OS are described. Note that the term "acquire" in this specification is used as a concept that does not necessarily require a request. Further, "data" is treated as the same data even when the format (such as a text format, binary format, or flag format) is modified, provided that content of the data is essentially the same.

The printer 1 can acquire a print job and execute printing based on the acquired print job. The print job includes page description language (PDL) data and printer job language (PJL) data. The PDL data is print data described in a page description language that represents the image to be printed. The PJL data represents various printer-related parameters. The format of the PDL data is Printer Command Language (PCL) or Portable Document Format (PDF), for example. The printer 1 may acquire a print job by receiving the print job from an external device via the communication interface 14 or by reading the print job from USB memory mounted in the communication interface 14.

Print data described in a page description language may include text objects representing characters to be printed. The text object in the print data includes information on each character to be printed, such as a typeface, character code, character size, and character color, but does not include information representing the outline of the character. When rasterizing print data containing text objects, the printer 1 acquires sets of glyph data from font information, such as the built-in font information 22 and the DL font information 23, and uses the acquired sets of glyph data to generate raster data specifying the shapes of the characters.

The character code in the text object that specifies the character to be printed is described in a character encoding system specific to the format of the print data. For example, print data in the PDF format is described using character codes of the Unicode Standard, which is the character encoding system used in the font information 30 of the TrueType font format (see FIG. 2). When print data is in the PDF format, the printer 1 can correctly retrieve sets of glyph data from the font information 30 based on character codes included in the print data because character codes in the font information 30, which uses the Unicode character encoding system, correspond to character codes contained in the print data. In other words, when a character code in the font information 30 matches a character code in the print data, these character codes are associated with a same character.

On the other hand, the print data of the PCL 5 format can set a character encoding system used for the print data in a manner selectable from various character encoding system including the Unicode character encoding system and character encoding systems different from the Unicode character encoding system. Here, the PCL 5 format is a file format developed by Hewlett Packard (U.S. registered trademark of HP HEWLETT PACKARD GROUP LLC). Because the character encoding system used in such print data is not necessarily the Unicode Standard, the printer 1 may be unable to retrieve correct sets of glyph data from the font information 30, which is of the Unicode character encoding system, on the basis of the character codes included in print data of the PCL 5 format. In other words, when character codes in the font information 30 uses the Unicode character encoding system, such font information 30 may not correspond to character codes contained in the print data. That is, there is a possibility that the same character code is associated with different characters between the print data and the font information 30.

Below, steps in a printing process performed on the printer 1 when the printer 1 receives an instruction to print a job containing print data in the PCL 5 format will be described with reference to the flowchart in FIG. 3. The CPU 11 of the printer 1 executes the printing process in accordance with the print control program 21. Print data in the PCL 5 format can contain character codes of a non-Unicode character encoding system. Here, the printer 1 can learn the type of the PDL data on the basis of the PJL data, for example. The print data may include font information embedded therein to be used fonts specified in the print data.

In S101 of the printing process, the CPU 11 sequentially acquires a process object in the print data included in the received print job. The process object is a unit of data that the CPU 11 performs a process indicated therein. For example, the process object is a command, a text object, a drawing object, or an image object. The process of S101 is an example of an acquisition process. The print data can include a plurality of process objects. In S102 the CPU 11 determines whether the acquired object specifies a font selection instruction. When the acquired process object includes a command specifying a font, the CPU 11 determines that a font selection instruction is specified and received. When the CPU 11 determines that a font selection instruction is received (S102: YES), in S103 the CPU 11 executes a font determination process. When the process object includes a font selection instruction, the process object may include a character code whose character is to be rendered by the font specified in the font selection instruction.

Steps in the font determination process will be described with reference to the flowchart in FIG. 4. In S201 of the font determination process, the CPU 11 determines whether font information for the specified font is available. For example, the CPU 11 determines that font information is available when the font information is embedded in the print data. The CPU 11 also determines that font information is available when information for the specified font is included in one of the built-in font information 22 or DL font information 23 stored in the memory 12. For example, when the CPU 11 finds, from the built-in font information 22 and DL font information 23, font information whose typeface is the same as that of the specified font, the CPU 11 determines that the specified font corresponds to the found font information and thus determines that the font information is available.

When the CPU 11 determines that font information is available (S201: YES), in S202 the CPU 11 acquires that font information for the specified font. For example, when the font information is embedded in the print data, the CPU 11 acquires this font information from the print data and stores the acquired font information in a designated area of the memory 12. Alternatively, when the specified font corresponds to the built-in font information 22 or the DL font information 23 stored in the memory 12, the CPU 11 reads that corresponding font information for the specified font from the memory 12 and stores the acquired font information in the designated area of the memory 12. Here, the CPU 11 may process or modify the acquired font information into a form that can be readily used in subsequent processes.

Through the process S205-S207, the CPU 11 determines whether the character encoding system used in the acquired font information matches the character encoding system used in the print data. In S205 the CPU 11 determines whether the acquired font information is compatible with the print data.

Font information embedded in print data is configured on the basis of the character encoding system used for the print data. Thus, in S205, the CPU 11 determines that the acquired font information is compatible with the print data (S205: YES) when the acquired font information is font information embedded in the print data.

Further, the print data of the PCL 5 format can arbitrarily set a character encoding system (Unicode or non-Unicode character encoding system) used therein. On the other hand, each of the built-in font information 22 and DL font information 23 may be or may not be configured on the basis of the character encoding system the same as that used in print data of the PCL 5 format. The CPU 11 does not specify the character encoding system used in the print data at the time of S205, and thus does not explicitly determine that each of the built-in font information 22 and DL font information 23 is not compatible with the print data. However, the CPU 11 determines that the acquired font information is not compatible with the print data (S205: NO) when the CPU 11 acquires the font information from the built-in font information 22 and DL font information 23 that uses the Unicode character encoding system. Note that this NO determination of S205 is provisional because there is a possibility that the print data of the PCL 5 format uses the Unicode character encoding system, and a final determination as to the compatibility will be made in S207 as described below.

For example, when the font information acquired from the built-in font information 22 and DL font information 23 is in the TrueType font format, a character encoding system in the True Type font format is the Unicode character, and thus the CPU 11 provisionally determines that the font information is not compatible with the print data (S205: NO).

When the CPU 11 determines that the font information is not compatible with the print data (S205: NO), in S206 the CPU 11 determines whether an instruction for setting a symbol set has been received. When the print data includes a command specifying a symbol set setting, the CPU 11 determines that an instruction to set a symbol set has been received. In PCL 5 print data, the character encoding system is specified by symbol-set information indicating the symbol set. A symbol set is for identifying the character encoding system in print data of the PCL 5 format. The process of S206 is an example of a specifying process.

When the CPU 11 determines that an instruction to set the symbol set has been received (S206: YES), in S207 the CPU 11 determines whether the setting instruction specifies the symbol set "18N". The character codes in the symbol set "18N" configure a character encoding system compatible with character codes in the Unicode Standard. Therefore, when a character code included in the print data is a character code of the symbol set "18N", the CPU 11 can use the character codes contained in the print data to acquire sets of glyph data from the acquired font information 30 which uses character codes in the Unicode Standard. Thus, reaching a YES determination in S207 is equivalent to identifying a character code in the print data compatible with a prescribed character encoding system of the acquired font information (the Unicode standard, for example). In other words, YES determination in S207 indicates that the CPU 11 finally determines that the acquired font information is compatible with the print data though NO determination is once made in S205.

When the CPU 11 determines that the setting instruction specifies a symbol set other than "18N" (S207: NO), the CPU 11 finally determines that the acquired font information is not compatible with the print data. In this case, in S211 the CPU 11 determines whether the memory 12 stores a conversion table 24 that supports the specified symbol set. As shown in the examples of FIGS. 5A and 5B, a conversion table 24 stores correspondences between character codes in different character encoding systems. The printer 1 stores a plurality of conversion tables 24 in the memory 12 in advance. In the examples of FIGS. 5A and 5B, the conversion tables 24 stored in the memory 12 include conversion tables 241 and 242. One or more conversion tables 24 may be stored in the memory 12 when the printer 1 is shipped from the factory or remaining one or more conversion tables 24 may be downloaded and stored in the memory 12 in accordance with user instructions after being shipped from the factory, as described below.

The conversion table 241 in the example of FIG. 5A maps character codes in the character encoding system of symbol set "8U" to character codes in the Unicode Standard. The conversion table 242 shown in FIG. 5B maps character codes in the character encoding system of symbol set "0H" to character codes in the Unicode Standard. The symbol set "8U" and the symbol set "0H" have different character encoding systems. For example, character code "68" are mapped to different characters in these character encoding systems that correspond to different character codes in the Unicode Standard, as illustrated in FIGS. 5A and 5B.

When the CPU 11 determines in S211 that a conversion table 24 supporting the specified symbol set is stored in the memory 12 (S211: YES), in S215 the CPU 11 reads this conversion table 24 from the memory 12. In S216 the CPU 11 determines that the font specified in the process object acquired in S101 is a font to be converted (character codes of the font to be converted). The process of S215 is an example of a reading process.

On the other hand, when the CPU 11 determines in S201 that font information for the specified font is not available (S201: NO), or when the CPU 11 determines in S206 that the print data does not include an instruction to set a symbol set (S206: NO), in S221 the CPU 11 determines that an error occurs. In other words, when font information for the specified font is neither embedded in the print data nor stored in the memory 12, the CPU 11 cannot acquire font information for that font and determines that an error occurs.

Further, the CPU 11 cannot identify the character encoding system when a symbol set has not been set. Thus, a NO determination in S206 is equivalent to the CPU 11 being unable to identify the character encoding system of the print data. Note that print data not containing an instruction to set the symbol set may refer to various cases, such as the print data being corrupted, the CPU 11 being unable to receive the symbol set setting command, or the unknown number being specified in the received symbol set setting command (the character encoding system being unable to be specified on the basis of the number specified in the received symbol set setting command). The printer 1 cannot obtain a suitable conversion table 24 when the character encoding system cannot be identified. In this case, the printer 1 cannot perform printing and ends the process with an error.

Further, when the CPU 11 determines that no conversion table 24 supporting the specified symbol set is stored in the memory 12 (S211: NO), in S231 the CPU 11 recommends the user to download the conversion table 24. For example, the CPU 11 displays information for a download website provided by the vendor of the printer 1 and informs the user that this font can be used by downloading a conversion table. The CPU 11 cannot convert the character code when no conversion table 24 supporting the specified symbol set is available. A NO determination in S211 is equivalent to CPU 11 being unable to read the conversion table. In S231 the CPU 11 may also attempt to download the conversion table in accordance with user instructions, for example. In this case, when the download is completed successfully, the CPU 11 may return to S211 to determine whether the downloaded conversion table can support the specified symbol set.

In S232 the CPU 11 determines whether an alternate font is available. An alternate font is a font used by the character encoding system of the print data and can be used in place of the specified font. The alternate font may be a prescribed font. For example, the built-in font information 22 stored on the printer 1 may include font information supporting various symbol sets so that one of fonts in such font information having the same character encoding system as the print data can be used as the alternate font.

When the CPU 11 determines that an alternate font is available (S232: YES), in S233 the CPU 11 changes the specified font to the alternate font. That is, the CPU 11 reads font information stored in the memory 12 for the alternate font and replaces the font information acquired in S202 with this alternate font information. At this time, the CPU 11 may notify the user that the font has been changed. Thus, when there is no conversion table 24 supporting the specified symbol set, the CPU 11 can generate raster data using the prescribed font. This can avoid a scenario in which the printer 1 eliminates all characters to be printed and prints an image containing no text.

However, when the CPU 11 determines that no alternate font is available (S232: NO), in S221 the CPU 11 determines that an error occurs. Because the printer 1 cannot perform printing based on the print job properly when there is no conversion table 24 supporting the specified symbol set and no alternate font available to use in place of the specified font, the printer 1 cannot perform printing and ends the process in error.

On the other hand, after changing the specified font to the alternate font in S233 or when determining in S205 that the font information acquired in S202 is compatible with the print data (S205: YES), in S241 the CPU 11 determines that the font is not to be converted. That is, there is no need to convert character codes when the specified font has the same character encoding system as the character codes contained in the print data.

Further, when the CPU 11 determines in S207 that an instruction has been received to set the symbol set "18N" (S207: YES), in S241 the CPU 11 determines that the font is not to be converted. Even in a case that the font information acquired for the specified font is a font compliant with the Unicode Standard, there is no need to convert the character code when the character encoding system of the print data is compatible with the Unicode Standard. Thus, when the character encoding system specified in the symbol set information is compatible with the Unicode Standard, the printer 1 generates raster data without converting the character code, thereby avoiding any wasteful processing.

After completing one of the processes in S216, S221, and S241, the CPU 11 ends the font determination process and returns to the printing process.

Figure 3:
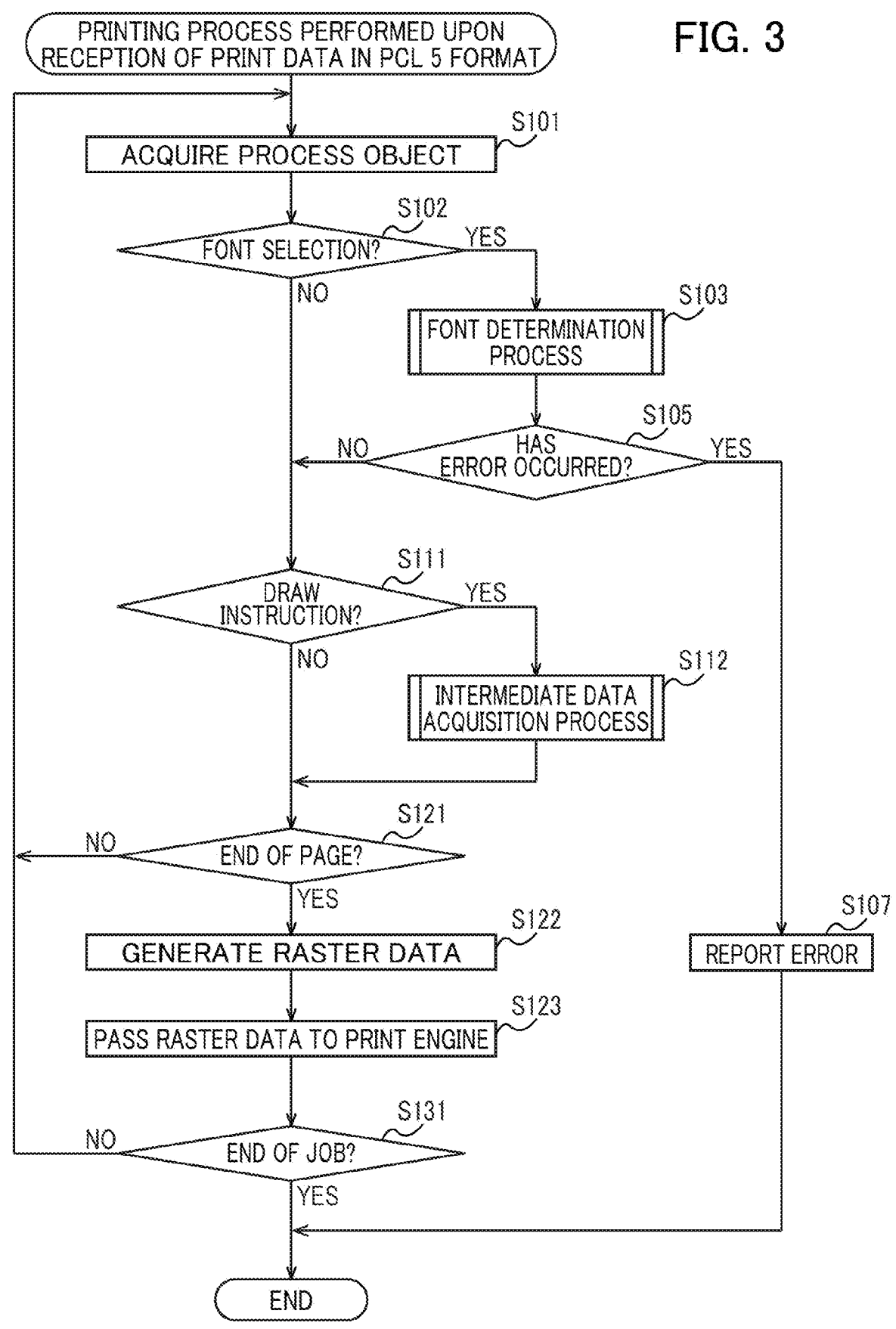
FIG. 3 is a flowchart illustrating a printing process for a print job.

Returning to the description in FIG. 3 of the printing process, in S105 the CPU 11 determines whether an error has occurred in the font determination process of S103. When the CPU 11 determines that an error has occurred (S105: YES), in S107 the CPU 11 reports the error and subsequently ends the printing process. When an appropriate font could not be selected or an appropriate conversion table could not be read, the printer 1 cannot properly print the job, and determines that an error occurs.

On the other hand, when the CPU 11 determines in S102 that the process object acquired from the print data specifies no font selection instruction (S102: NO) or determines in S105 that the font determination process has not resulted in an error (S105: NO), in S111 the CPU 11 determines whether the acquired process object specifies an instruction to draw a character. When the CPU 11 determines that a character drawing instruction is specified in the acquired process object (S111: YES), in S112 the CPU 11 executes an intermediate data acquisition process. The intermediate data acquisition process is a process to generate and thus acquire intermediate data. This intermediate data is data representing an image of one or more characters that are rendered using the same font information acquired in S103. The intermediate data may be raster data representing these characters. Here, the characters that are to be rendered using the same font information are the characters of the same typeface. Hereinafter, the character that can be rendered using the font information acquired in S103 is referred to as a target character. While the same typeface is specified in the process objects obtained the repeatedly-executed processes S101, the print data is configured so that no draw instruction is specified therebetween, in order that the intermediate data for the characters having the same typeface is generated at a time in one process of S112. After the draw instruction is specified and the intermediate data acquisition process is performed, a new process object specifying a font of a different type face is to be acquired and different font information is to be acquired for that typeface in the process of S103. Further, while the specified fonts are of the same typeface, the determinations as to whether the fonts are to be converted are the same, and thus the same conversion table is acquired in S215 when the fonts are determined to be converted, whereby the drawing process can be performed for theses fonts using the same conversion table.

Figure 6:
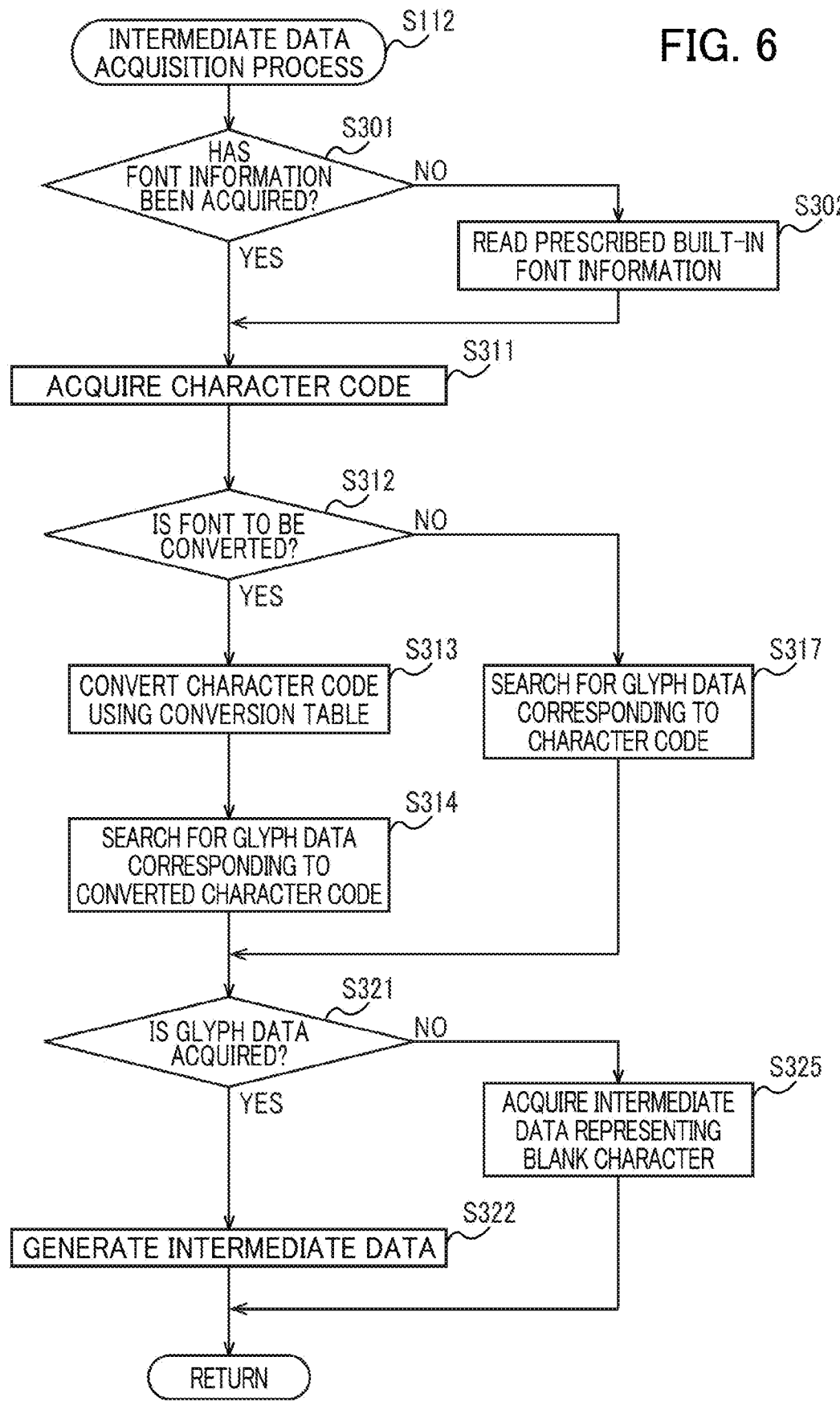
FIG. 6 is a flowchart illustrating an intermediate data acquisition process.

Here, steps in the intermediate data acquisition process will be described with reference to the flowchart in FIG. 6. In S301 of the intermediate data acquisition process, the CPU 11 determines whether the font to be used for printing has been determined and whether the font information for that font has been acquired. When no font selection instruction has not been specified in process objects which have been acquired through the repeatedly executed processes of S101, for example, the CPU 11 has not yet executed the font determination process and font information to be used has not been determined. Thus, when the CPU 11 determines that the font information has not yet been acquired (S301: NO), in S302 the CPU 11 reads a font included in the built-in font information 22, for example, that is suitable for the print data to be printed.

The font information read in S302 is font information, which is predetermined to be used by the printer 1 when a font specification has not been received. For example, the CPU 11 may read font information of an alternate font, as described in S232-S233 of the font determination process (see FIG. 4). Alternatively, the CPU 11 may end the intermediate data acquisition process in error when a font specification has not been received.

After completing the process in S302 or when determining in S301 that font information has been acquired (S301: YES), in S311 the CPU 11 acquires the character code specifying each target character to be printed from the print data. In S312 the CPU 11 then determines whether the font of one target character to be used is determined as a font to be converted. Because all the target characters can be rendered by the same font information, it is enough that the determination of S312 is made for a font of one of the target characters. When the CPU 11 previously determined in S216 of the font determination process (see FIG. 4) that the font is a font to be converted, the CPU 11 will reach a YES determination in S312.

When the CPU 11 determines that the font is to be converted (S312: YES), in S313 the CPU 11 converts the character code of each target character using the conversion table 24 read in S215 of the font determination process. Specifically, the CPU 11 acquires, as the converted character code, the character code of the Unicode character encoding standard mapped from the character code of each target character of the print data on the basis of the conversion table 24. The process of S313 is an example of a conversion process. The character code of each target character in the print data is an example of a first character code and a reference character code. A character code in a Unicode standard converted using the conversion table 24 is an example of a second character code and a target character code.

In S314 the CPU 11 uses the character code in the Unicode Standard, which constitutes the converted character code for each target character, to retrieve a corresponding set of glyph data from the font information for the font being used. For example, for each target character, the CPU 11 can obtain a glyph ID corresponding to a character code of the Unicode Standard using the character table 32 in the font information 30 (see FIG. 2) and can acquire a set of glyph data corresponding to that glyph ID using the location table 33 and glyph table 34.

On the other hand, when the font to be used is not a font to be converted (S312: NO), there is no need to convert the character code. Thus, in S317 the CPU 11 retrieves a set of glyph data associated with a character code in the print data from the font information, for each target character. For example, when font information corresponding to the specified symbol set has been acquired or when the character codes of the specified symbol set are compatible with character codes of the Unicode Standard, the CPU 11 can use the character code to acquire a suitable set of glyph data for each target character without converting the character code.

After completing the process in S314 or S317, in S321 the CPU 11 determines whether the set of glyph data is acquired for a target character. When the CPU 11 determines that the set of glyph data is acquired (S321: YES), in S322 the CPU 11 generates intermediate data representing the shape of the character being printed based on the set of glyph data, for that target character.

However, when the CPU 11 determines that a set of glyph data is not acquired for a target character (S321: NO), in S325 the CPU 11 acquires intermediate data representing a blank character for that target character. For example, when a glyph ID corresponding to a character code is not obtained or when a set of glyph data corresponding to a glyph ID is not obtained, the CPU 11 reaches a NO determination in S321. Note that the intermediate data obtained in S325 is not limited to a blank character but may represent another specific symbol determined in advance, for example. The CPU 11 repeats the process S321 and its subsequent process S322 or S325 for all the target characters. After completing the process of S322 or S325 for all the target characters, the CPU 11 ends the intermediate data acquisition process and returns to the printing process. After completing the process of S322 or S325 for all the target characters, the CPU 11 may integrate all the sets of intermediate data for target characters into one set of intermediate data.

Returning to the description in FIG. 3 of the printing process, following the intermediate data acquisition process of S112 or when determining in S111 that a character drawing instruction is not specified in the acquired process object (S111: NO), in S121 the CPU 11 determines whether an end-of-page command is specified in the acquired process object. When the CPU 11 determines that the end-of-page command is not specified in the acquired process object (S121: NO), the CPU 11 returns to S101 to acquire a next process object, and again determines whether any of the font selection instruction, character drawing instruction, or end-of-page command is specified in the next process object.

The print data may contain process objects having instructions other than font selection instructions and character drawing instructions. When the CPU 11 acquires such a process object including an instruction other than a font selection instruction, a character drawing instruction, or an end-of-page command, the CPU 11 generates and arranges intermediate data appropriately on the basis of the received instruction. For example, when an acquired process object includes a drawing object other than a text object, the CPU 11 generates intermediate data based on the received object.

Once the end-of-page command is specified in the acquired process object (S121: YES), in S122 the CPU 11 generates raster data on the basis of one or more sets of intermediate data generated for the current page, and in S123 passes the raster data to the print engine 15. Here, the print engine 15 executes printing based on the raster data received from the CPU 11. The process of S222 is an example of a printing process. The series of processes of S321-322 in the intermediate data acquisition process and processes of S122-S123 in the print job process an example of a printing process.

Next, in S131 the CPU 11 determines whether a job end command is specified in the acquired process object. Specifically, when the CPU 11 determines that no job end command is specified in the acquired process object (S131: NO), the CPU 11 returns to S101 to acquire a process object for a next page. When the CPU 11 determines that the job end command is specified in the acquired process object, the CPU 11 ends the print job process.

When obtaining print data in the PCL 5 format, the printer 1 identifies the character encoding system of the print data based on the symbol set setting instruction in the print data. Thereafter, the printer 1 can obtain sets of glyph data from font information having a different character encoding system by converting character codes using the conversion table 24 supporting the character encoding system. In other words, the printer 1 can correctly print characters included in PCL 5 print data using font information 30 in the TrueType font format (see FIG. 2).

The character encoding system for print data in the PDF format matches the character encoding system of the font information 30 in the TrueType font format. Therefore, when print data in a print job is in the PDF format and the specified font is included in the acquired font information in the Unicode Standard, the printer 1 reaches a YES determination in S207 of the font determination process (see FIG. 4) and a NO determination in S312 of the intermediate data acquisition process (see FIG. 6). The printer 1 can then obtain sets of glyph data corresponding to character codes in the print data from the font information 30. That is, the printer 1 can use the font information 30 to correctly print characters contained in print data of the PDF format.

Next, steps in a conversion table acquisition process for acquiring a conversion table will be described with reference to the flowchart in FIG. 7. The CPU 11 of the printer 1 executes the conversion table acquisition process in accordance with the print control program 21 upon receiving an instruction via the user interface 13 to acquire a conversion table 24, for example. The user can issue an instruction to acquire the conversion table 24 after receiving a recommendation to download the conversion table 24 in S231 of the font determination process (see FIG. 4), for example.

In S401 of the conversion table acquisition process, the CPU 11 accepts a selection of a symbol set. The CPU 11 may display information about the symbol set on the screen recommending the download to notify of that information to the user, for example. The displayed information may be based on the symbol set of the print data specified in S206. Rather than receiving a selection for a symbol set, the CPU 11 may instead be configured to accept an instruction to download conversion tables 24 for all symbol sets at once.

In S405 the CPU 11 determines whether a download instruction has been received. For example, the user connects the printer 1 to a prescribed server 100 that stores conversion tables 24, sets up the communication environment for downloading files, and issues an instruction to execute the download. The process of S405 is an example of a reception process. The download instruction is an example of a download command. The server 100 is an example of an external device.

The printer 1 may also be capable of receiving a download command from a personal computer connected to the printer 1. In this case, the printer 1 may be capable of accepting, as the download command, a command including a symbol set specification and a download instruction.

When the CPU 11 determines in S405 that a download instruction has been received (S405: YES), in S406 the CPU 11 attempts to download the conversion table 24. In S407 the CPU 11 then determines whether the download has been successful.

When the CPU 11 determines that the download has been successful (S407: YES), in S408 the CPU 11 stores the downloaded conversion table 24 in the memory 12. When a conversion table 24 of the same symbol set as the conversion table 24 downloaded in S406 is already stored in the memory 12, the CPU 11 may overwrite the stored conversion table 24 with the new conversion table 24 or ask the user whether to do so. The series of processes of S406-S408 is an example of a download process.

Following the process in S408 or when determining in S405 that an instruction to cancel the download has been received instead of a download instruction (S405: NO) or when determining in S407 that the download has been unsuccessful due to a communication error or the like (S407: NO), the CPU 11 ends the conversion table acquisition process. The CPU 11 may accept an instruction to retry the download when a download is unsuccessful.

Figure 7:
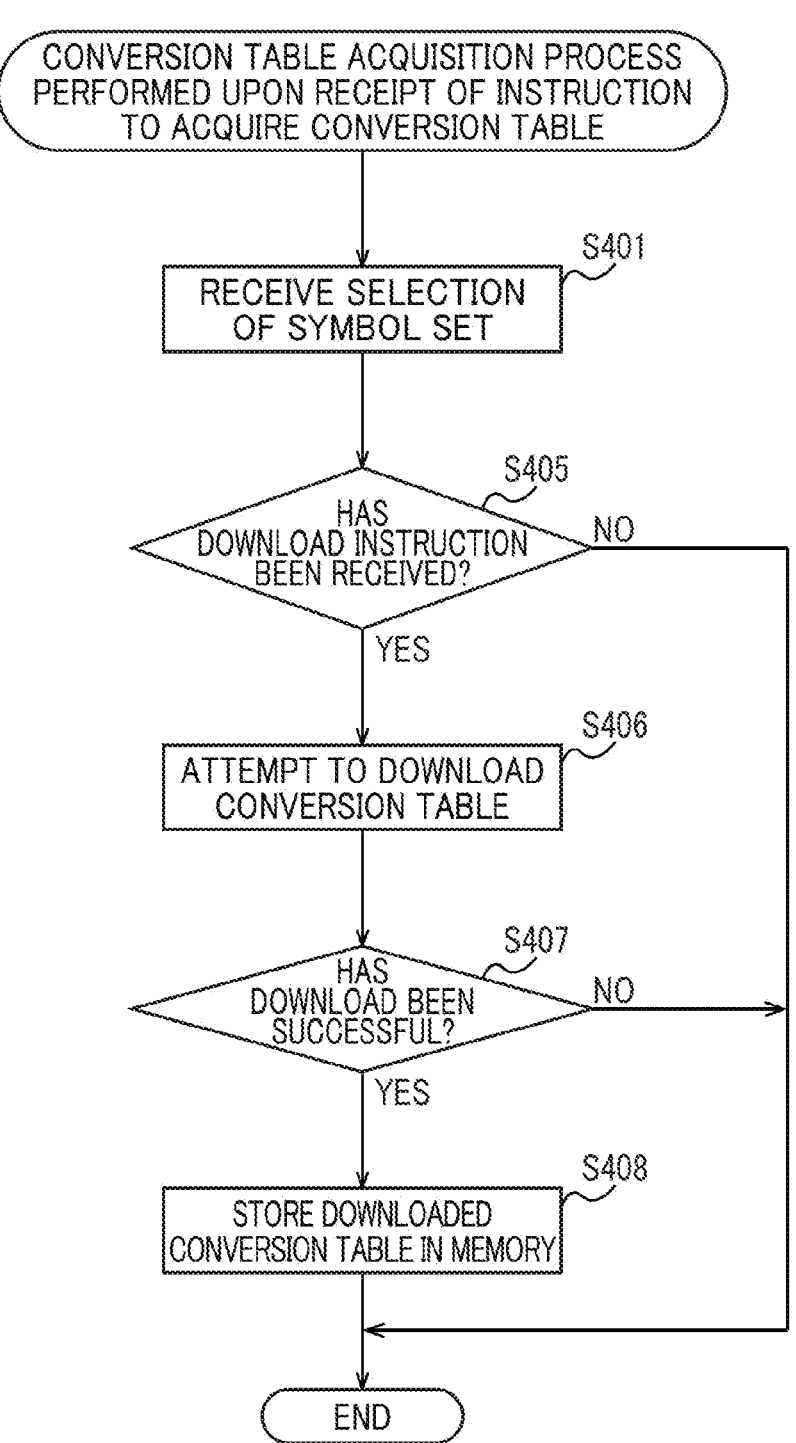
FIG. 7 is a flowchart illustrating a conversion table acquisition process.

Because the printer 1 can download and store conversion tables 24, as described in FIG. 7, the printer 1 can add and save new conversion tables 24 after being shipped from the factory. The printer 1 can also easily save revised versions of existing conversion tables 24. On the other hand, when a conversion tables 24 is for each symbol set is stored in the memory 12 before the printer 1 is shipped from the factory, no processes or operations are required to download conversion tables 24.

As described above, when the printer 1 of the embodiment acquires print data in the PCL 5 format containing non-Unicode character codes, the printer 1 reads a conversion table 24 that supports the symbol set representing the character encoding system specified by that print data from the memory 12. Using this conversion table 24, the printer 1 converts character codes contained in the print data to character codes in the Unicode Standard, enabling the printer 1 to generate raster data from a plurality of sets of glyph data of a font using character codes in the Unicode Standard. Therefore, a probability that the printer 1 properly prints characters in the specified font can be increased, even when the print data is in the PCL 5 format.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the printer 1 may not be a device having only the printing function and may be any device having a different function in addition to a printing function, such as a multifunction peripheral, a copying machine, and a facsimile device.

The configurations of the font information 30 and the conversion tables 24 shown in the drawings are merely examples and are not limited to these configurations. For example, some font information may contain a plurality of character tables each being described in a respective one of a plurality of types of character encoding systems. Some conversion tables may also specify relationships between the character encoding system indicated by a specific symbol set and a non-Unicode character encoding system.

Figure 4:
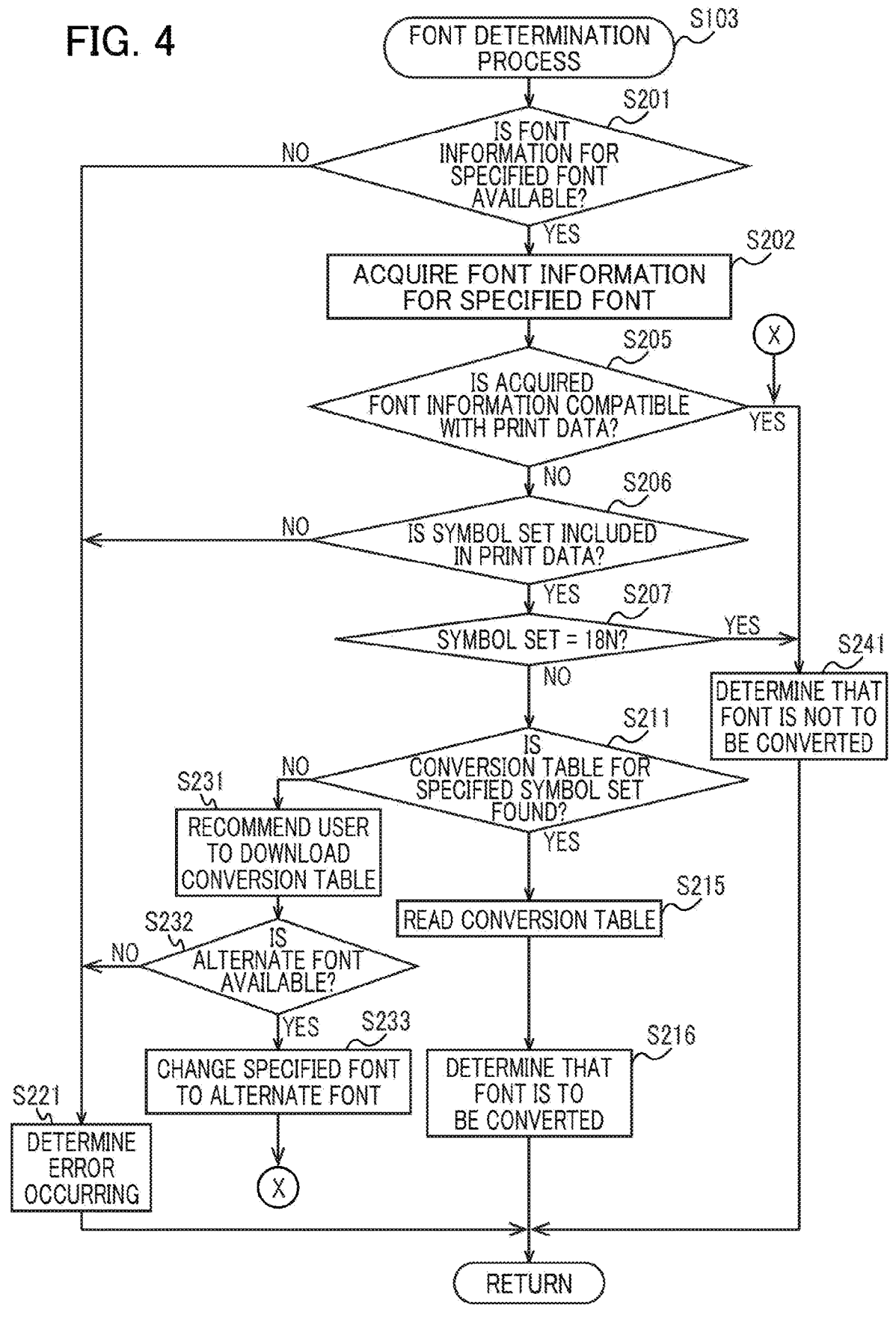
FIG. 4 is a flowchart illustrating a font determination process.

In the font determination process described in FIG. 4 of the embodiment, the CPU 11 uses an alternate font (S233) when determining that a conversion table 24 supporting the specified symbol set is unavailable (S211: NO), provided that an alternate font is available (S232: YES), but the CPU 11 may be configured not to use an alternate font. That is, when no conversion table 24 is available for the specified symbol set, the printer 1 may simply end the printing process in error.

Further, the printer 1 need not be provided with the capacity to download conversion tables 24. That is, the printer 1 may be provided with a plurality of conversion tables 24 when shipped from the factory and may not accept additions or revisions to those conversion tables 24. Alternatively, the printer 1 need not be provided with conversion tables 24 when shipped from the factory. In this case, a user wishing to perform printing based on print data in the PCL 5 format, for example, may download the appropriate conversion table 24 prior to printing.

In the font determination process of the above embodiment (see FIG. 4), the printer 1 determines that an error occurs when font information for a specified font is unavailable (S201: NO) or when a symbol set setting has not been received (S206: NO), but the printer 1 may instead be configured to use predetermined font information in such cases.

In any of the flowcharts disclosed in the embodiment, the plurality of processes that makes up any of a plurality of steps may be executed in parallel, or the order in which the processes are performed may be modified in any way that does not produce any inconsistencies in the processes.

The processes disclosed in the embodiment may be performed by a single CPU, a plurality of CPUs, hardware such as one or more application specific integrated circuits (ASICs) or any combination of these. The processes disclosed in the embodiment may be implemented through various manners, such as a recording medium storing program instructions for the processes, or a method defining the processes.

What is claimed is:
1. A printer comprising:
a memory;
a print engine; and
a controller configured to perform:
    acquiring print data;
    a print-data process based on the print data, the print-data process including:
      a specific process when the print data includes a print-data character code, the specific process being to: specify a print-data character encoding system describing the print-data character code; and determine whether the print-data character encoding system is a prescribed character encoding system, the print-data character encoding system associating each of a plurality of characters with a respective one of a plurality of print-data character codes;

a reading process when the specific process determines that the print-data character encoding system is not the prescribed character encoding system, the reading process being to read a print-data conversion table stored in the memory, the print-data conversion table being a conversion table for the print-data character encoding system, the print-data conversion table mapping each of a plurality of reference character codes of the print-data character encoding system to a respective one of a plurality of target character codes of the prescribed character encoding system;

a conversion process when the reading process is performed, the conversion process being to convert the print-data character code into a converted print-data character code using the print-data conversion table, the converted print-data character code being a specified target character code among the plurality of target character codes in the print-data conversion table, the specified target character code being mapped from a reference character code matching the print-data character code among the plurality of reference character codes in the print-data conversion table; and a printing process when the conversion process is performed, the printing process being to generate raster data using the converted print-data character code and instruct the print engine to perform printing based on the raster data.

2. The printer according to claim 1, wherein when the specific process cannot specify the print-data character encoding system, the controller performs none of the reading process, the conversion process, and the printing process to terminate the print-data process with error.

3. The printer according to claim 1, wherein the print-data process further includes:

a second printing process when the specific process specifies that the print-data character encoding system is compatible with the prescribed character encoding system, the second printing process being to generate second raster data using the print-data character code without performing the reading process and without performing the conversion process, and instruct the print engine to perform printing based on the second raster data.

4. The printer according to claim 1, wherein when the reading process cannot read the print-data conversion table, the controller performs neither the conversion process nor the printing process to terminate the print-data process with error.

5. The printer according to claim 1, wherein the print-data process further includes:

a second printing process when the reading process cannot read the print-data conversion table, the second printing process being to generate second raster data based on a prescribed font acquired using the print-data character code without performing the conversion process, and instruct the print engine to perform printing based on the second raster data.

6. The printer according to claim 1, wherein the memory stores in advance a plurality of conversion tables, each of the plurality of conversion tables being a conversion table for a respective one of a plurality of character encoding systems and mapping each of a plurality of reference character codes of the respective one of the plurality of character encoding systems to a respective one of the plurality of target character codes of the prescribed character encoding system, wherein the reading process reads, as the print-data conversion table, a conversion table for a character encoding system matching the print-data character encoding system among the plurality of conversion tables stored in the memory.

7. The printer according to claim 1, wherein the controller is configured to further perform:

a receiving process to receive a command to download a specific conversion table; and a downloading process to download the specific conversion table according to the received command, and store the downloaded specific conversion table in the memory, wherein the reading process reads, as the print-data conversion table, a target conversion table for a character encoding system matching the print-data character encoding system among a plurality of conversion tables including the downloaded specific conversion table in the memory.

8. The printer according to claim 1, wherein the prescribed character encoding system is in conformity with a Unicode encoding standard.

9. The printer according to claim 1, wherein when the memory stores font information that includes a plurality of sets of glyph data each specifying an outline of a respective one of a plurality of character codes of the prescribed character encoding system, the printing process acquires a set of glyph data associated with the converted print-data character code among the plurality of sets of glyph data in the font information stored in the memory, generates the raster data using the acquired set of glyph data, and performs printing based on the raster data.

* * * * *